United States Patent Office 3,422,866
Patented Jan. 21, 1969

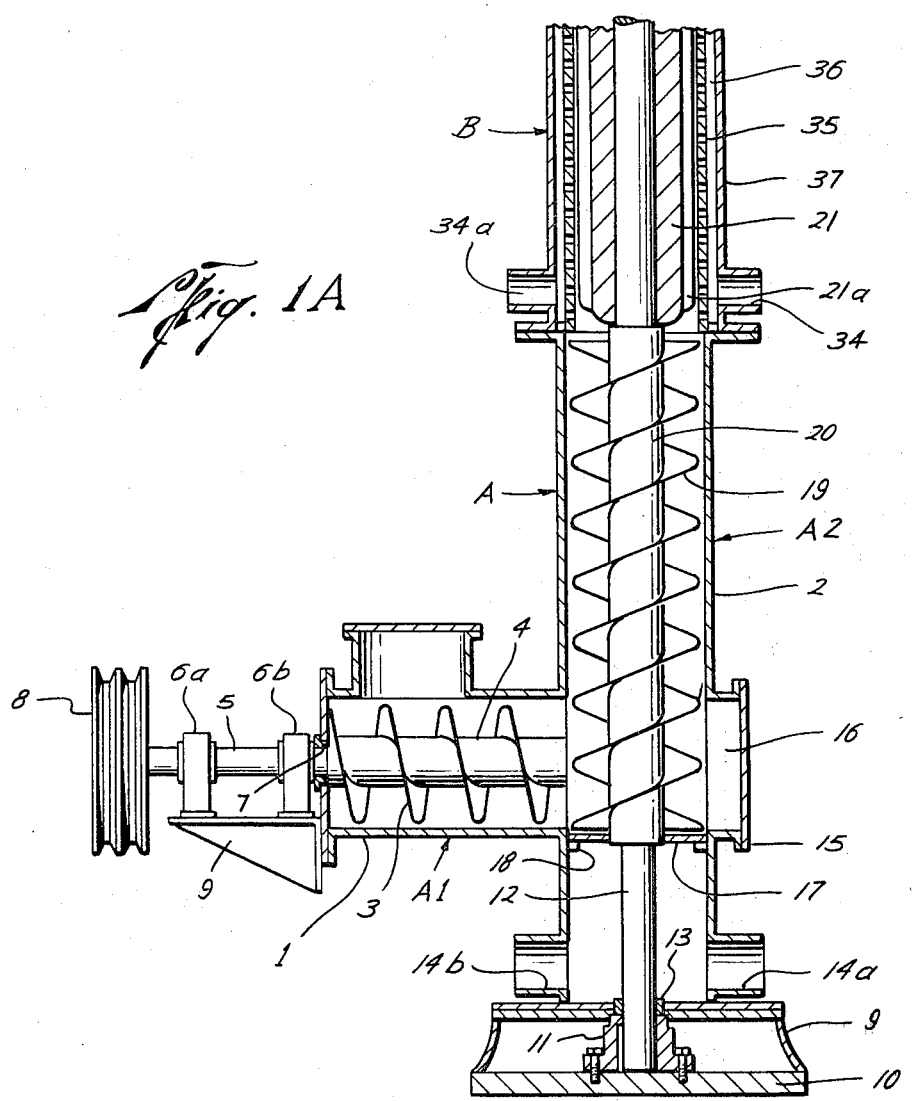

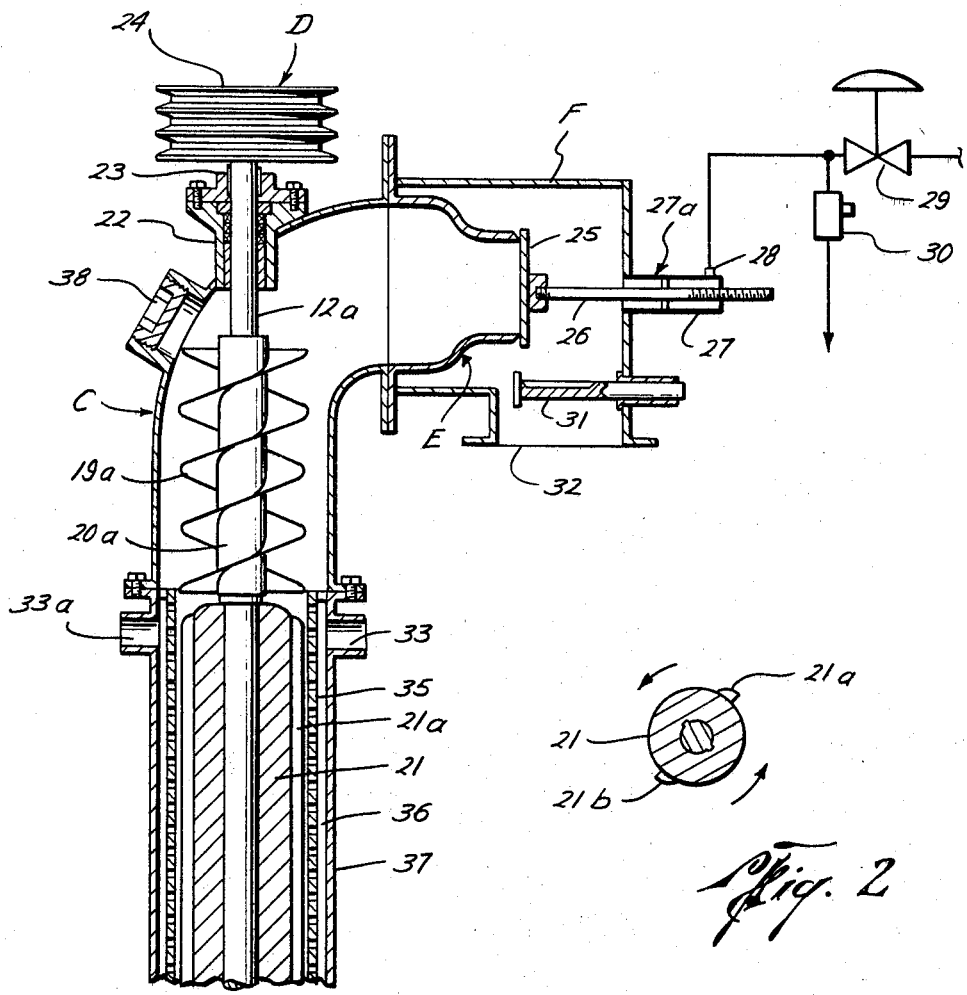

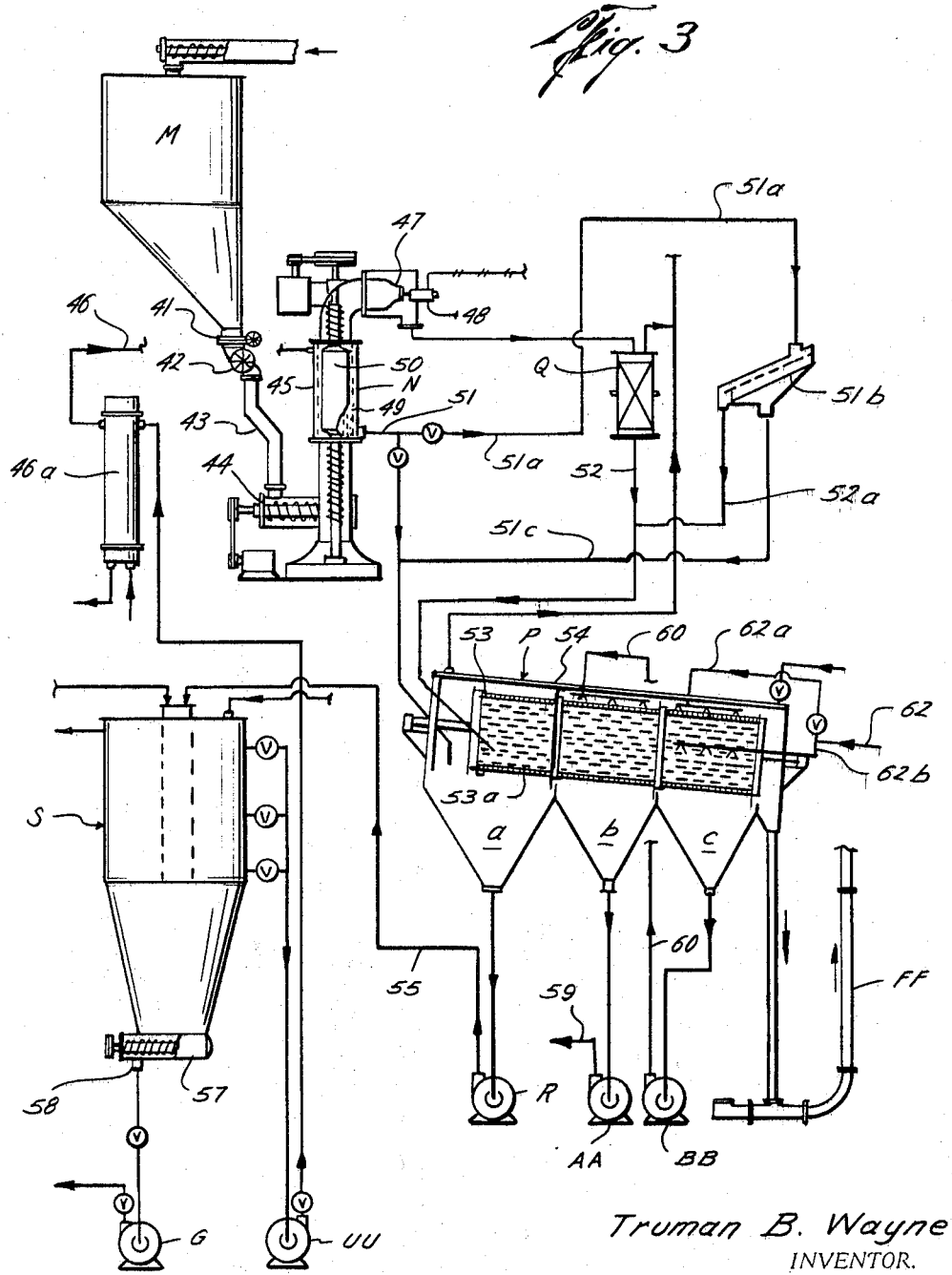

3,422,866
METHOD FOR UPFLOW MILLING OF GRAIN
Truman B. Wayne, P.O. Box 13086,
Houston, Tex. 77019
Continuation-in-part of application Ser. No. 404,315,
Oct. 16, 1964. This application Nov. 7, 1967, Ser.
No. 681,174
U.S. Cl. 146—221.8          18 Claims
Int. Cl. B02b 5/00

ABSTRACT OF THE DISCLOSURE

A method for upflow milling of a grain such as rice or barley having a bran coat thereon. The method includes the steps of wetting the grain with a bran-coat softening agent and passing the grain upwardly through a milling chamber and maintaining a selected back pressure thereon to thereby control the degree of milling to which the grain is subjected.

---

This application is a continuation-in-part of application Ser. No. 404,315, filed Oct. 16, 1964, entitled Vertical Upflow Mill, now Patent No. 3,382,904, and application Ser. No. 529,814, filed Feb. 24, 1966, both by the same inventor. The latter application is a continuation-in-part of copending application Ser. No. 308,560, filed Sept. 12, 1963, now abandoned, which in turn was a continuation-in-part of prior applications Ser. No. 43,351, filed July 18, 1960, and Ser. No. 81,969, filed Jan. 11, 1961, both now abandoned, which were copending therewith. The aforesaid application Ser. No. 408,702, filed Nov. 3, 1964, now Patent No. 3,261,690, which in turn was a continuation-in-part of said application Ser. No. 308,115, filed Sept. 11, 1963, now abandoned, and of prior application Ser. No. 301,492, filed Aug. 12, 1963, now Patent No. 3,217,769, both of which were copending therewith and of prior application Ser. No. 107,505, now abandoned, with all of said applications being by the same inventor.

This invention relates to improvements in method for milling grains of the class of rice and barley. It is particularly useful in milling brown rice and especially for simultaneous solvent extraction and milling of this grain, but is not limited to such use.

In the conventional rice milling process of commerce, the rough, or paddy rice, is first cleaned of dirt, straw and other debris and is sent to stone or rubber shellers which remove the hulls and some loosely adhering bran within the hull enclosure and surrounding the more adherent bran layers over the endosperm.

Rice with its hulls removed is called "brown rice" and retains its light bran coat. This bran coat is made up of seven distinct layers which envelope the starchy interior of the kernel. Most of the six outer layers and part of the seventh, or aleurone layer, are removed in the succeeding operations. Since the aleurone cells are rich in protein and this constituent is present also in the endosperm, only about 10% of the protein of the hulled rice is removed in the milling process. The oil, present largely in the germ, is usually removed to the extent of about 85%, and the proportion of mineral salts is reduced nearly 70%.

The mills used in the past for removing the bran coats from the endosperm have been of the horizontal or vertical type. The horizontal mills in most common use consist essentially of a horizontal cylindrical or hexagonal shell having perforations therein, a rapidly revolving rotor mounted concentrically with the shell and providing an annular space between the rotor and shell through which rice moves. During passage of the rice through this space, the grains are rubbed against the perforated shell and against each other with sufficient force to remove bran from the rice kernels. This surface grinding operation is carried out under time and feed rate conditions which will produce the desired degree of removal of the outer bran layers from the rice kernel. The milling operation is rather severe and breaks a substantial portion of whole rice grains into two or more fragments, this breakage being due to the combination of effects such as impact, mechanical stresses and generated heat. Breakage of rice kernels is, of course, increased in areas of overpacking and overstressing of rice in the mill. The loss of whole head rice kernels varies with the variety, state of curing, handling in the rice dryer and the subsequent storage and the severity of milling. This breakage results in serious economic loss, as broken rice brings only about half the price of the whole head rice.

An inherent defect in the horizontal rice mill, regardless of how carefully and evenly it is fed, is that the pressure between the rotor and the milling stream is never equal at all points around the 360° annulus between the milling rotor and screen. There is a tendency for the rice to be carried under the rotor by gravity and to form a mass of higher density and compaction than exists in the area above the rotor. The milling pressure in this area is thus increased and there is some tendency toward stagnation in the movement of the rice through the area. This results in a higher degree of milling, but it also results in increased breakage of kernels.

Vertical rice mills with downward flow therethrough have long been exemplified by the so-called "pearling cones." These employ a conical rotor having an abrasive surface which rotates with in a conical, perforated stator. The annulus between the rotor and stator may be increased by a simple adjustment moving the rotor or stator with respect to each other. The principal reason for using the conical rotor and stator is to retard the downward travel of rice through the annulus and to improve the effects of centrifugal force operating within the annulus. Machines of this type, unless employed in series, have failed to give satisfactory results in the milling of rice, partially because rice has a strong tendency to fall through the annulus so rapidly that it is not properly milled. If devices of this sort are set with sufficient clearance between the rotor and the stator to avoid breakage of rice, incomplete milling has resulted, and if set to provide a clearance small enough to insure complete milling of the rice, there has been sufficient breakage of rice kernels that no advantage has been gained over horizontal mills.

It is an object of this present invention to provide an improved method for milling rice and barley which can remove bran from the kernels with substantial completeness, and at high rate of throughput without excessive breakage of the kernels.

Another object is to provide an improved method in which substantially complete removal of bran from rice or barley grains may be accomplished without over-milling.

Another object is to provide an improved method for milling of the above type which is especially adapted for use with simultaneous wet milling and solvent extraction.

Other objects and advantages will become apparent to those skilled in the art from consideration of the following detailed description and the attached drawings.

One mill for carrying out the present invention may include a feed section arranged to introduce brown rice, (which may, if desired, be wet with an oily miscella or other bran softening agent described in U.S. Patent Nos. 3,330,666 or 3,261,690 by the same inventor), into a vertical screw elevator disposed to pass the rice upward through a vertical milling section superimposed upon and concentric with the vertical screw elevator. The milling section includes a housing, which preferably is an upward extension of a vertical, cylindrical housing of the screw elevator, a perforate milling screen within, concentric with, and spaced from the housing, and a rotor, preferably mounted with the elevator screw flight section upon a common central shaft, and located within and concentric with the screen. Separate shafts and drive means for the rotor and elevator, respectively, may be used if desired, but this increases the complexity of the construction and operation of the mill without corresponding increase in advantage. The rotor is of such diameter as to provide a selected clearance between it and the screen, effective to agitate the rice and rub the grains against each other and the milling screen, the rice is passed upward by pressure from the vertical screw elevator through the annulus provided by this clearance.

The housing enclosing the milling screen is liquid tight, and a means is provided for introducing miscella through nozzles in the housing to flush the surfaces of the perforate milling screen. A means for draining the flushing miscella and bran solids from an annular space between the screen and housing also is provided. A second section of vertical screw elevator is arranged in an upper part of the housing to receive milled grain from the milling section and deliver it to a discharge nozzle. The discharge nozzle is fitted with means to maintain and regulate a back pressure on the rice, preferably a pressure discharge gate responsive to a means for maintaining a regulating pressure on the discharge gate, and a discharge housing is provided for receiving the milled products from the discharge gate and discharging them from the mill.

Briefly stated, the invention of this application is for a milling process comprising the steps of passing grain such as rice or barley upwardly through a generally upwardly extending milling chamber and milling at least a portion of the bran-coat therefrom in the chamber. It also includes the step of applying a selected back pressure on the grain in the chamber to thereby control the degree of milling to which the grain is subjected.

The presently preferred process comprises the steps of introducing husked grain retaining its bran coat into a mill, introducing an extractive solvent or an oil-containing miscella into the mill in quantity to form a solid-liquid slurry with grain; passing the slurry upward through the mill; milling bran from the grain during its upward passage through the mill; withdrawing miscella and bran from the mill; passing the grain upward above a level from which miscella is withdrawn to a point of discharge from the mill and maintaining a selected back pressure on the grain. It is believed that the invention may be more clearly understood by reference to the drawings showing one apparatus which may be used for carrying out the invention and in which:

FIGS. 1A and 1B together form one generally central vertical sectional view of a mill, with FIG. 1A showing the bottom portion thereof and FIG. 1B showing the top portion.

FIG. 2 is a generally cross-sectional view of the mill rotor assembly shown in FIG. 1.

FIG. 3 is a generally schematic-flow diagram of a mill and system which is particularly adapted for milling brown rice in accordance with the method of this invention.

The embodiment illustrated in FIGS. 1 and 2 comprises a feed screw and screw elevator section A, an intermediate wet milling section B, a discharge head C upon which is mounted the drive assembly D, a discharge nozzle E and a discharge housing F.

Section A comprises the complete feed screw assembly designated as A–1 which includes a screw housing 1 attached to housing 2 of the screw elevator assembly A–2 by welding, bolted flanges or in any other suitable manner. The screw housing 1 may enter the housing 2 as a straight intake at an angle of 90° as illustrated, or as an offset or tangent intake as desired. The feed screw includes a spiral 3, which may be standard or short pitch, and single or double flight as desired, firmly attached to a central pipe or solid shaft 4. A drive shaft 5 is coupled to shaft 4 and is mounted through double outboard bearings 6a and 6b and also stuffing box or liquid mechanical seal 7 and is driven by means of drive sheave 8 or alternate means which is operated by a suitable propulsion unit. The entire assembly is supported by the bracket 9 which is in turn properly supported on a structural member as desired.

The screw elevator assembly A–2 contains a base 9a having a base plate 10 in which is bolted a replaceable step bearing 11. A vertical shaft 12 projects into step bearing 11 and held in running position by a set collar 13 which is keyed to the shaft, or otherwise rigidly attached thereto. The housing 2 has liquid inlets 14a and 14b which may be half pipe couplings welded into the wall of the housing 2, and a flanged combination clean-out door and sight glass 15 mounted on flange nozzle 16. The liquid inlets 14a and/or 14b may also function as liquid drains under conditions of countercurrent flow. A means for allowing free upward circulation of liquid while preventing entry of large grain particles into the section below, illustrated as perforated metal plate 17 having oblong perforations therein, is supported within housing 2 on a suitable support illustrated as ring 18. The plate 17 preferably is made up of two 180° plate sections so that they may be readily removed and replaced through the clean-out door 15.

A helical flight 19, which may be standard or short pitch single or double flight, as desired, is firmly attached to a pipe or solid shaft 20. Shaft 20 may be a continuation of solid shaft 12, but it preferably is of pipe construction which may be joined to shaft 12 by welding or preferably by any suitable means so that shaft 12 may be a short end shaft which is easily replaceable. However, when sections B and C are short, the shaft 12 may continue through the milling rotor 21, helical flight 19a, pipe shaft 20a and stuffing box 22. A preferred arrangement, particularly when sections B and C each exceed 24 inches in length is to couple pipe shaft 20a to the upper end of an extension of shaft 12 through rotor 21. Shaft 12a is coupled or otherwise attached to the upper spiral flight comprising pipe shaft 20a and flight 19a, and extends through the stuffing box housing 22, bearing 23 and sheave 24. The revolving components through which shafts 12 and 12a pass are locked on the shafts by suitable bolted or threaded couplings or keys, keyseats and set screws to provide the required attachment and to maintain proper alignment.

The discharge nozzle E is attached to the discharge head C by suitable means such as flanged or screwed connections. It contains a concentric or preferably an eccentric swaged fitting having its smaller end beveled where it contacts discharge gate 25. The gate 25 is attached rigidly or with a ball and socket or swivel attachment to shaft 26 which is an extension of a piston rod in an air or hydraulic cylinder 27, attached to a piston movable therein.

To illustrate the operation of the cylinder by means of air, although an analogous hydraulic fluid system is contemplated as an equivalent thereof, control air is admitted to cylinder 27 through inlet 28. Air pressure regulator 29 provides air at any desired pressure between 0 and 40 p.s.i. The pressure on the piston of the air cylinder is set by operation of flow control device 30 which is normally closed. However, if the rice pressure against the discharge gate 25 exceeds the pressure imposed by the pneumatic cylinder at the selected control air pressure, or the air pressure downstream of air pressure regulator 29 exceeds the control air pressure setting, the flow control device 30 will open and discharge air to the atmosphere until the pressure has returned to the pressure which it is desired to be maintained on the air cylinder. Other equivalent means for maintaining selected pressure on the gate 25 may be other forms of linear actuators, as for example, hydraulic cylinders, spring loaded adjustable pressure devices, ball screw actuators, linear induction motors and other forms of mechanical transducers which are capable of transmitting a predetermined and fully adjustable amount of pressure to the discharge gate.

The milling pressure within the apparatus is thus controlled by maintaining sufficient pressure against the discharge gate 25 to partially oppose or counteract the discharge pressure within discharge nozzle E, and which will produce the desired degree of milling as observed by means of the sealed sampling device 31. The milled rice together with some of the freed bran coat co-mingled therewith are discharged from the apparatus nozzle 32 to any desired bran separation and solvent recovery apparatus.

The operation of the improved milling process of the present invention utilizing the apparatus assembly described above will now be described with respect to milling of rice, although it is to be understood that the process is also applicable to barley.

Brown rice, which is the rice kernel with its original bran coat and germ in the form from which it emerges from a shelling or husk removing operation, is admitted through a spout or chute into feeder section A–1 where it is conveyed into the screw elevator section A–2. The brown rice is contacted and wetted with recycled strong miscella, or a more dilute miscella or solvent, as soon as it enters the feeder section and travels upward through the screw elevator section. The miscella, which consists of an extractive solvent containing rice oil, is recycled from a settler or other subsequent extraction step or apparatus (not shown in FIGS. 1 and 2) which receives miscella from a previous milling or extraction cycle, is admitted through either or both nozzles 14 and 14a and rises in the apparatus at least to the overflow level of nozzles 34 and 34a where it leaves the apparatus and returns to the miscella settler.

The screw elevator when used on free flowing materials becomes a semi-positive displacement unit only after it is primed in much the same manner as a centrifugal pump, i.e. the casing and screw flight must be filled in solid cross section with the material to be elevated before it will operate. Thus, it is in principle a pump. In order to elevate materials it must revolve at sufficiently high rate as to overcome the force of gravity upon the material. Otherwise, a free flowing material will trickle down between the screw flight and casing, and slide down the helical flight, and thus lose prime and fail to elevate. However, once primed and operated at sufficient r.p.m. it will discharge the material at the same rate that it is fed into the screw. This operation is quite distinct from that of a horizontal screw conveyor which operates strictly as a positive displacement device except for a minor degree of slippage, and will convey at far lesser speeds than will a screw elevator.

The rice will enter the vertical screw elevator from the feed screw as the solid component of a rice miscella slurry. The rice tends to settle rapidly from the slurry when agitation slows down beyond the point at which it will maintain the slurry in suspension. Under conditions of slow rotation of the elevator much of the rice will settle down the annulus between the screw flight and the housing. It is also probable that there will be some sliding of grain down the spiral flight until a consolidated solids column is produced. However, this will occur more slowly and to a lesser extent than were the solids in the dry state are in air instead of in a liquid.

For this reason, a high rotation speed for the vertical screw conveyor is preferred. Once the fluid column rises sufficiently to form a continuous column in the screw elevator section A, the fast turning screw flight will act as a screw pump if the liquid column is maintained throughout the casing from liquid inlet to the liquid discharge point. If this liquid discharge point is one or both of the lower pair of nozzles 34 and 34a, or of the upper pair of nozzles 33 and 33a, one the milling section, and there is no liquid above such a point, the screw pump effect ceases at this point. If the liquid inlet shown at the bottom of the housing should be shut off, the spiral flight and the milling rotor act merely as agitators since the elevation of liquid above the overflow point cannot occur without losing the prime below that point. When the latter occurs, the liquid level simply falls to again form a solid column. Except at much higher r.p.m. than is presently contemplated, the liquid level will not tend to lift and lose prime, so that the screw flight and the rotor will merely act as an agitator for the liquid.

If instead of simply a liquid column, there were a solid-liquid slurry, the screw flight will elevate the solids through the liquid column on more nearly a positive displacement principle than if the liquid were not present. The solvent wet rice is somewhat more cohesive than the free flowing rice would be under similar conditions of feed rate and r.p.m., and it will pass through the solvent column and be elevated by the upper screw flight section and packed into the discharge head, apply pressure against the discharge gate and be discharged from the apparatus without the necessity for maintaining the pressure of a full liquid column against the discharge gate. Substantial draining of the milled rice is thus obtained before the rice is discharged.

The rate of discharge of the rice solids under these circumstances is the same as the feed rate once the column is established. Therefore, to regulate the milling rate, the feed screw will have a variable speed drive. The degree of milling is regulated by pressure imposed on the discharge gate by the air or hydraulic cylinder, or an equivalent means for regulating the discharge pressure.

Machines constructed as described above and utilizing the method of this invention may be operated at extremely high rates of production when compared with production rates of conventional dry milling machines. Their capacities will vary with such factors as feed rate, revolutions per minute of the vertical screw flight and milling rotor, the degree of milling as determined by discharge gate pressure and to some extent according to the gallons per minute of miscella pumped through the apparatus. One of these machines, however, will do the milling work ordinarily requiring several horizontal rice mills of the types commonly used in rice milling.

Simultaneously with the travel of the brown rice upward through the milling section B where it is agitated and rubbed against perforate milling screen 35 by milling rotor 21, miscella is admitted through nozzles 33 and 33a or similar smaller nozzles placed concentrically with casing 37 to spray miscella on milling screen 35 to keep its perforations open and to wash the solids from the milling operation from the annulus 36 between milling screen 35 and casing 37. The suspension of solids in the miscella is then discharged through nozzles 34 and 34a together with the recycled miscella which was introduced through nozzles 14a and/or 14b, and is transferred to the miscella settler above-mentioned but not shown in FIGS. 1 and 2.

The milled rice which has had its bran coat and germ removed in the milling section B, but which is not completely free of loosely adhering bran particles, is then moved upward into the discharge head C by means of a spiral 19a and is accumulated in discharge nozzle E against discharge gate 25 through which it is released into discharge housing F and then leaves the apparatus as previously described.

An alternate method of operation is to maintain a full liquid column throughout the apparatus so that the spiral conveyor sections will act as screw pumps and convey the rice-miscella slurry to the discharge nozzle E and thence out of the apparatus to discharge gate 25 and discharge housing F. The miscella will, in addition to, or in lieu of, flowing through nozzles 34 and 34a, and/or 33 and 33a, be discharged with the rice through nozzle 32 to a separator reel or vibrating screen (not shown in FIGS. 1 and 2) which effects the separation between the rice and miscella and the bran solids derived from the milling operation before the miscella bran solids slurry returns to the miscella settler previously mentioned. A second alternate method of operation is to introduce the miscella through nozzle 38 and/or through nozzles 33 and 33a instead of through the lower nozzles 14 and 14a to provide a countercurrent flow. The discharge may occur at discharge nozzle E when containing a full liquid column, and/or at nozzles 34 and 34a. Nozzles 14 and/or 14a may be used to provide part of the drainage under operation or may be shut off entirely except when used to drain all miscella from the apparatus.

The apparatus is adapted to easy dismantling for insertion of various designs, lengths and types of milling rotors and milling screens; also for extensions of the discharge head C and its screw flight by interposing a section of conveyor casing between milling section B and discharge head C so that apparatus may function as a screw elevator beyond the milling section B to elevate the milled products to any desired discharge elevation. If the total height of the apparatus exceeds 12 feet, it is advisable to install internal stabilizers to prevent excessive shafting run-out and whip which may occur in long shaft assemblies. The stabilizer consists of a screw conveyor hanger with a replaceable bearing which is mounted and housed in an access opening (not shown) in the housing A–2. This is a standard fixture which is used in tall screw elevators and no claim of novelty is made for this particular element. One such stabilizer at each ten to twelve foot increment of shaft length is sufficient. The interposition of the hanger bearing at such points involves an interruption of the continuity of the flight so that the hanger should be designed for maximum strength with a narrow contoured surface to present least interruption and resistance to the continuity of solid flow at hanger locations.

When milling rice, a satisfactory clearance between the ribbed projections 21a and 21b on the milling rotor 21 and the perforate screen 35 is ¼ inch, but may range between 3⁄16 inch and 5⁄16 inch without material loss of milling efficiency. While only one type of rotor is illustrated, it is to be understood that many variations in rotor type may be made if desired. Instead of having two milling ribs arranged vertically, two or more ribs in continuous or broken spirals may be used. When wet milling under the conditions herein described, much of the bran removal and polishing of the milled kernels is accomplished by friction between the kernals. The rotor and perforate stator milling section is therefore of lesser importance in this type of operation than in dry milling machines and even in certain wet milling machines disclosed in other of my pending patent applications.

While in the preceding paragraph reference is made to a perforate milling screen against which the rice kernels are rubbed and thereby sufficiently abraded to partially or wholly remove the bran layers and germ, it should be understood that the terms "perforate milling screen" or "perforate screen" are not intended to limit the invention to either a wire mesh screen or to the so-called punched or perforated metal sheeting. Fulfillment of the required function of the said perforated screen may also be realized by the use of cast, stamped or molded cylindrical or slightly tapered hollow conical sections prepared from fused or sintered mineral or metallic materials such as silicon carbide, aluminum oxide, mullite, silica, and powdered metals or metallic alloys which are fabricated so as to possess sufficient porosity to allow the circulation of solvent miscella through their walls, and which also present an abrasive surface adapted to produce a satisfactory degree of surface milling of the brown rice kernals between the walls of the rotor. Materials having such properties are commercially available in various shapes and sizes and are commonly used in cast refractories, abrasives and in gaseous and liquid diffusion and filtration, respectively.

It should also be understood that if the solvent miscella is introduced into the apparatus by means of nozzles 14a and/or 14b in concurrent flow and discharged from the apparatus through nozzle 32, or if the solvent miscella is introduced through nozzle 38 so that it proceeds downward in partial or full counterflow to the vertical movement of the rice, the milling surface 35 in FIG. 1B need not be porous or perforate. Instead, the milling surface may be constructed from a cast, molded, or scored metallic or non-metallic material which presents a surface that is sufficiently abrasive to remove the bran layers and germ to the desired degree.

Screw elevators ordinarily operate at speeds ranging from 275 r.p.m. for a sixteen inch diameter flight to 500 r.p.m. for a four inch diameter flight in casings provided ¼ inch to ½ inch clearance from the spiral flight. It is preferred to use four inch or six inch diameter flights attached to shafts made of two inch pipe and 1½ inch couplings in the upflow solvent extractive milling machines described and to operate them within the range of about 500 to 600 r.p.m.

As is evident from the preceding description, the course of the solvent-wet rice is always upward, but the solvent of miscella used to cool the rice, extract the fatty substances and coloring matter and to separate the milled bran coat from the kernels may be concurrent, counter current or even in mixed flow with the flow direction of the rice.

The term "full miscella" is used in this specification and claims to mean a volatile solvent effective to extract fatty components from rice and bran which contains at least 6%, and preferably about 6% to 12% of rice oil.

A full miscella, defined above, containing rice oil in the stated proportions will penetrate the bran layers on brown rice in a very short time sufficiently to soften the bran to a degree such that it is easily removable in a milling step. The rapid action of full miscella is in contrast to the slow action of solvent alone, which penetrates the bran layers so slowly that softening action is not obtained in any reasonable time. A short contact time, as for example, the time required to pass through an inlet section in a mill, usually not more than from 20 seconds to a minute or so, minimizes penetraton of miscella into the endosperm which would subsequently necessitate a longer extraction time to remove oil from the kernels. It is further preferred that in the washing and extraction steps applied to the rice fraction after withdrawal from the milling step the flow of rice to be countercurrent to the direction of flow of solvent through the washing and extraction steps and be carried out by passing solvent through an at least slightly expanded bed of rice, preferably in a vapor tight rotary washer and/or on vibrating screens to extract residual fatty substances from the kernels and to substantially completely remove residual bran and fine polish particles from the surfaces of the kernels. Fresh solvent enters into a final washing and extraction stage and moves countercurrently to the flow of rice in a plural number of stages before being discharged as a weak miscella to a first bran extraction step.

In the present invention it is preferred that a full miscella be maintained by a short recirculation cycle through a mill and a primary miscella settler and be controlled by controlling the quality of full miscella withdrawn to other process steps and replaced by a more dilute miscella entering the primary miscella settler. Using a recycle step of this type, it is possible on starting out to quickly build up the required amount of rice oil in the miscella supplied to presoftening and milling steps, and it is possible to pass a full miscella to oil recovery steps while maintaining a full miscella of selected strength for circulation to the wetting and milling steps.

FIG. 3 shows a portion of a flow diagram illustrating a sequence of processing steps of one embodiment of the invention utilizing a mill somewhat similar to that shown in FIGS. 1 and 2, and showing certain equipment for performing certain of the above referred to additional steps. In the particular system illustrated in FIG. 3, brown rice from rough or paddy rice shelling and cleaning operations (not shown) is conveying by a suitable screw, flight, belt or pneumatic conveyor, or delivered by gravity into the brown rice bin M, and is withdrawn through a suitable bin gate 41 and rotary vapor lock feeder 42 into chute 43 which delivers the brown rice to the feeder section of solvent extractive milling machine N, which may be silimar to that shown in FIGS. 1 and 2.

The mill shown in FIG. 3 comprises a horizontal feeder 44, a horizontal or vertical milling chamber 45 wherein the miscella-wetted rice is subjected to a milling action in the presence of sufficient full miscella introduced through pipe 46 to provide the desired cooling and flushing actions on the rice and milling by-products, respectively. Discharge of the milled rice from the apparatus is controlled by the application of a regulated pressure on the discharge gate 47 by means of air or hydraulically operated cylinder 48. The recycled miscella which is heated or cooled as required, by heat exchanger 46a and introduced through pipe 46 freely circulates through the perforations of the milling screen 49 located within the chamber which surrounds the milling rotor 50, and escapes mainly through miscella-bran slurry drain pipe 51, but partially also with the rice through discharge gate 47. Circulation is provided by pump UU.

The miscella-bran slurry discharges directly through pipe 51 into the hopper section a of rotary drainer-extractor P. There will be a corresponding drain pipe 51 from each milling machine when more than one milling machine is used, as usually will be the case, which enters a common manifold at pipe 51, which enters hopper a of apparatus P. The milled rice and its residual milling by-products and solvent are discharged from the extractive milling machines when more than one milling machine is used, into vapor-tight, horizontal flight conveyor Q which conveys the products to its discharge chute 52 which feeds the upper end of the inclined rotary screen 53 which operates within the vapor-tight housing 54 of the rotary drainer and extractor P.

Alternatively, the miscella slurry containing a major proportion of bran removed from kernels of the rice during the milling step may be passed through line 51a to vapor-tight vibratory screen 51b, which is equipped with a perforate or mesh screen which will pass the miscella and fine particles, inclusive of bran, but retain and allow the recovery of broken rice which has commercial value as brewer's rice or the larger broken grades of rice. The miscella-bran slurry is then returned to drain pipe 51 through line 51c, and broken rice screened out is returned to chute 52 by chute 52a.

The rotary screen 53 may be fitted with lifter flights which lift and cascade the rice to promote free drainage into hopper a of the miscella and bran slurry through its oval or rectangular perforations or screen mesh openings 53a. The miscella-bran slurry is then transported by means of slurry pump R through pipe 55 into the downcomer 56 of primary miscella settler S where the bran solids are settled in the specially shaped tank to a sludge concentration of approximately 35 percent solids. The sludge density may be varied within wide limits of from 20 percent to 55 percent solids, this depending on the available settling time, but the material may be successfully discharged at the higher density by means of discharge screw conveyor 57 or an equivalent bottom rake, into pipe 18 of suitable diameter to allow flow to pump G and to subsequent processing equipment (not shown).

The milled rice from chute 52, consisting of whole and broken kernels which are larger than the finely broken rice, and its adherent bran and polish particles which will wash through the oblong or rectangular perforations in the metal or wire screen of the revolving cage within rotary drainer and extractor P are cascaded within the upper section to allow drainage of the miscella-bran slurry into compartment a of the miscella collection tank, as was previously described. The milled rice then proceeds to the middle section b where it is washed by spraying with weak miscella which is pumped through pipe 60 by third extraction stage miscella pump BB which takes suction from the third compartment c of the miscella collection tank of apparatus P. The effluent washings, now a weak miscella, are pumped by pump AA through line 59 to suitable bran extraction equipment (not shown). Finally, the milled rice enters the third or last section of apparatus P where it is washed with the dilute washings received from a subsequent washing step (not shown) through pipes 62, 62a and 62b to spray nozzles which spray the rice in the third section. The latter drains into compartment c of the miscella collection tank.

The washed rice, which still contains small amounts of dilute, oil-containing solvent and some polish fines, is elevated by elevator FF where it is subsequently subjected to a washing step with pure solvent and subsequently desolventized.

The brown rice processed by the invention may be of any variety which is classified under the three main divisions according to grain size and shape, i.e., long, medium or short grained varieties.

It will be seen that in the sequence of processing steps of the present invention a recirculated miscella comprising a volatile solvent containing rice oil within an oil concentration range of 6% to 12%, or higher, the actual concentration depending on the number of times the miscella is again recycled to the extractive milling machines from the primary miscella settler, and the rate at which the miscella is withdrawn to the evaporator for solvent and oil recovery and replaced by medium miscella from bran extraction, provides an improved process for pre-softening bran on the brown rice and extractive milling of the rice in an upflow process in that the presoftening time may be softened to the normal time, usually not more than a minute or so, required for the brown rice to pass through the inlet portion of a milling machine.

The amount of strong miscella recycled to the extractive milling machines may be varied from 75% to 200% of the weight of the entering brown rice. Less than 75% may not provide adequate rice cooling and bran separation during the bran removal operation. The more recirculated miscella that is used, the better, up to a practical limit of 200%, above which little additional benefit is derived and handling problems increase. The most advantageous temperature range for the recycled miscella is from 90° to 130° F. Lower temperatures retard the bran coat softening effect; higher temperatures unduly increase miscella penetration into the endosperm where it performs no useful function and rquires more time for extraction. Higher temperatures also tend to set up thermal stresses in the rice and to result in increased breakage of the rice kernels.

From the foregoing it will be seen that this invention is one well adapted to attain all of the ends and objects hereinabove set forth, together with other advantages which are obvious and which are inherent to the apparatus and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method of milling a grain selected from the group consisting of rice and barley, said method comprising the steps of:

wetting said grain with solvent containing a bran-coat loosening agent;
passing the grain vertically upward through a vertical mill;
and maintaining a selected back pressure on grain moving upward through the mill.

2. The process of claim 1 wherein:
the bran softening agent is oil.

3. A method for milling a grain selected from the group consisting of rice and barley, said method comprising the steps of:
wetting said grain with a solvent containing a bran-coat softening agent;
passing the wet grain vertically upward through a vertical mill by pressure from below;
therein milling bran from the grain;
extracting the grain with additional solvent during its passage upward through the mill;
and maintaining a selected back pressure on the grain as it passes through the mill.

4. The process of claim 3 wherein:
grain and solvent containing bran are separately withdrawn from the mill.

5. The process of claim 3 wherein:
the selected back pressure is adjusted according to completeness of milling of grain issuing from the mill.

6. A method for milling a grain selected from the group consisting of rice and barley, said method comprising the steps of:
passing said grain upwardly through a generally upwardly extending milling chamber and milling at least a portion of the bran from said grain while said grain is in said chamber;
and applying a selected back pressure to said grain in said chamber to thereby control the degree of milling to which said grain is subjected.

7. The invention as claimed in claim 6 including the step of:
passing a solvent through said milling chamber in intimate contact with said grain therein.

8. The invention as claimed in claim 6 including the step of:
milling said grain with a bran-coat softening agent in intimate contact therewith.

9. The invention as claimed in claim 6 wherein:
said milling chamber is generally circular in cross section and in which said grain is subjected to frictional rubbing to remove said bran therefrom.

10. The invention as claimed in claim 7 wherein:
said solvent containing bran is withdrawn from said milling chamber separately from the milled grain.

11. The invention as claimed in claim 6 including the steps of:
slurrying said grain with solvent;
and forcing said slurry upwardly into said milling chamber.

12. The invention as claimed in claim 8 including the steps of:
forcing said grain upwardly through a wetting chamber spaced generally below and in communication with said milling chamber;
and passing liquid solvent containing oil through said wetting chamber in intimate contact with said grain therein to thereby soften the bran on said grain.

13. The invention as claimed in claim 7 wherein:
said solvent is passed generally downwardly through said milling chamber;
and contacting said grain with a bran-coat softening agent by passing said grain and solvent containing oil generally upwardly through a wetting chamber spaced generally below and in communication with said milling chamber.

14. The invention as claimed in claim 6 including the steps of:
passing said milled grain from said milling chamber to a discharge chamber spaced generally upward from said milling chamber;
and contacting said grain in said discharge chamber with a solvent to extract fatty components therefrom.

15. The invention as claimed in claim 7 wherein:
said solvent, said milled grain and removed bran are withdrawn from said milling chamber together.

16. A method for milling a grain selected from the group consisting of rice and barley, said method comprising the steps of:
slurrying said grain with miscella in a wetting chamber to thereby soften the bran-coats of said grain;
agitating and pumping said slurry upwardly from said wetting chamber into a milling chamber spaced generally thereabove and in communication therewith;
milling at least a portion of the bran from said grain in said milling chamber by applying frictional rubbing forces thereto;
passing a solvent through said milling chamber in intimate contact with said grain therein to thereby extract oil therefrom;
passing said milled grain generally upward to a discharge chamber spaced generally above said milling chamber;
applying a selective back pressure to said grain in said milling chamber by controlling the rate of discharge of said grain from said discharge chamber.

17. The invention as claimed in claim 16 including:
separately withdrawing said solvent containing extracted oil and bran from said milling chamber.

18. The invention as claimed in claim 17 wherein:
said grain is brown rice;
and said solvent is recycled full miscella.

References Cited

UNITED STATES PATENTS

| | | | |
|---|---|---|---|
| 403,389 | 5/1889 | Seck | 146—279 X |
| 2,530,272 | 11/1950 | Thrasher | 146—221.8 |
| 2,752,247 | 6/1956 | Chandler | 99—80 |
| 2,829,055 | 4/1958 | Ozai-Durrani | 146—221.9 X |
| 2,867,256 | 1/1959 | Earle | 146—221.9 |

W. GRAYDON ABERCROMBIE, *Primary Examiner.*

U.S. Cl. X.R.

99—80